United States Patent Office 3,732,162
Patented May 8, 1973

3,732,162
METHOD OF REMOVING OIL SPILLS FROM WATER
Frederic C. McCoy, Beacon, Howard V. Hess, Glenham, and Rodney L. Sung, Fishkill, N.Y., assignors to Texaco Inc., New York, N.Y.
No Drawing. Continuation-in-part of application Ser. No. 25,588, Apr. 3, 1970. This application July 6, 1971, Ser. No. 160,193
Int. Cl. C02b 9/02
U.S. Cl. 210—40      7 Claims

ABSTRACT OF THE DISCLOSURE

Oil spills are removed from the surface of a body of water by contacting the oil with a coagulating amount of a coagulant such as asphalt and mixtures of wax or asphalt with anti-caking agents. Enough coagulant is used to form a floating, semi-solid mass with the oil. The coagulant may be used in finely divided form or in a molten state.

CROSS-REFERENCE TO CO-PENDING APPLICATION

This application is a continuation-in-part of commonly assigned co-pending application Ser. No. 25,588 filed Apr. 3, 1970, and now abandoned.

BACKGROUND OF THE INVENTION

The present invention is concerned with a method for cleaning up oil slicks or oil spills upon the surface of a body of water, such as may occur in the vicinity of marine oil terminals and shipping facilities and as a result of the wreck of oil tankers near the shore.

The problem of cleaning up and disposing of oil spills floating on a body of water has become considerably more serious in continental waters as pollution becomes more general, because under these circumstances even small spills aggrevate a worsening situation. Indeed, major spills, due to off-shore accidents, owing to their sheer volume, can be calamitous.

Among the proposals made in the prior art for removing oil slicks and spills from marine surfaces is a method disclosed in U.S. Pat. 3,198,731 issued on Aug. 3, 1965 to E. R. De Lew which comprises applying to an oil while it is floating on the water an agent which congeals the oil. Included among such agents are liquid metal soaps, molten wax and lanolin. These materials form a water-in-oil emulsion when applied to the oil slick in contact with the water which is said to be removable from the water by fine mesh nets, screens or perforated clam shell brackets. However, oil still will drain out of these separating means with water as these means are lifted out of the water.

In U.S. Pat. No. 3,414,511 issued on Dec. 3, 1968 to D. O. Hitzman it is proposed to use expanded vermiculite to pick up oil from marine surfaces. This mineral absorbs a considerable amount of oil and is not believed to remain buoyant on a seaway because of the normal agitation taking place. Indeed the patentee indicates that vermiculite used in accord with his invention will float upon the surface of the water when the water is quiescent.

In U.S. Pat. No. 3,464,920 issued to Person et al. on Sept. 2, 1969 there is disclosed a method of removing oil from the surface of water by adding thereto an organic material which has been rendered oleophilic and hydrophobic by treatment with an organosilane. This method is costly when one considers the extent of oil spills and its effect on marine life is not known.

French Pat. No. 1,564,290 issued Mar. 10, 1969 to E. C. Colomo discloses a process for forming agglomerates with floating oil by contacting the oil with liquid hydrocarbons which solidify upon contact therewith. The patent suggests also adding clay, dirt or plaster to cause the agglomerates to sink.

A similar approach is found in U.S. Pat. 2,464,204 issued on Mar. 15, 1949 to I. Baker, where oil is removed from the surface of water with carbon.

Turning to a different approach, it has also been proposed to employ a rather spongy plastic material to absorb the oil. While it is possible to use for the sponge, materials which have a preferential affinity for oil, nevertheless the oil must be continuously expressed or otherwise squeezed out of the spongy material if the oil recovery process is to be continuous. This technique is complicated by the fact that spongy oleophilic materials which best absorb oil to the exclusion of water at the same time may tend to become structurally weakened and damaged by a continuous process. As a result, these materials soon become incapable of fully retaining their structural integrity particularly under the repeated mechanical stresses of the pressures necessary to express the oil therefrom, and unless these materials are mounted upon and supported by a rigid physical structure of some sort, they soon become useless for their intended purpose.

While foamable polyurethane and polystyrene are effective to absorb oil spills, they are prohibitively costly due to their current market prices.

This invention comprises the use of a coagulant such as asphalt having a melting point above about 250° F., and mixtures of asphalt and petroleum waxes with hydrophilic anticaking agents to absorb oil floating on water, the amount of coagulant used being from about 10 to about 100% of the weight of the oil such that the coagulant and the oil form a floating semi-solid mass with the oil which has a lesser density than the body of water, that is, less than 1.0 for fresh water or less than 1.02 for sea water. Alternatively, the coagulant may be sprayed while in the molten state onto the oil spill where it will solidify and flux with the oil. Regardless of the way in which the semi-solid mass has been formed, it can be picked up from the surface of the body of water by traversing the perimeter of the oil spill with a ship equipped with a perforated boom. The boom serves to collect the coagulate and to transfer it periodically to a container or hold aboard the ship. There can also be used special collecting equipment such as described in commonly assigned U.S. patent application Ser. No. 875,579 filed Nov. 10, 1969. But regardless of the precise manner in which the coagulate is picked up from the body of water, it can be further treated, for example, by heating, to remove entrained water and then used, for example, as bunker fuel.

Suitable coagulants for the practice of the present invention include petroleum asphalts, and mixtures of wax or asphalt with hydrophilic anti-caking agents such as high surface area alkaline earth metal silicates, silica and talc.

A preferred composition is a mixture of 85–99% of finely divided asphalt with 1 to 15% of anti-caking agent. Preferred asphalts are those which have a specific gravity of less than 1 and a Susceptibility Index of between 2.0 and 4.0. Such a mixture can readily be prepared as described in commonly assigned U.S. Pat. No. 3,305,474, issued Feb. 21, 1967, by heating an asphaltic residuum which is solid at room temperature to between 100 and 200° F. above its softening point and introducing the resultant molten asphaltic residuum into a poll of anti-coalescing liquid maintained at a temperature at least 75° F. below that of the said softening point while agitating the liquid sufficiently to cause a violent and irregular movement thereof. The asphaltic residuum separates as a powder which is recovered from the liquid phase and is mixed with about 1 to about 15% by weight, and preferably from about 5 to about 10%, of a hydrophilic anti-caking agent such as silica, calcium silicate, talc, diatomaceous earth, and bentonite.

Asphalts as soft as about 180° F. R & B softening point may be used in the above described process. However, very hard asphalts usually having R & B softening point above about 250° F. may be powdered in suitable grinding equipment and used without any anti-caking agents in the present invention.

Wax suitable for the present use includes the relatively oil-free waxes of various crystal sizes and also the so-called slack waxes and petrolatums. The latter may contain as much as 15% or more oil. The wax melting points may range from about at least 110° F. to 200° F. or higher. Free-flowing wax powders can be prepared by a procedure similar to that described above for producing powdered asphalts. A preferred wax is slack wax having a melting point of about 140° F. and an oil content of about 12% obtained by solvent-dewaxing a wax distillate to prepare an SAW–40 Neutral Oil. A composition containing 85 to 95% weight of this wax and 5 to 15% by weight of a microfine calcium silicate is particularly satisfactory for treating oil spills.

The optimum amount of coagulant to be used in a particular case will depend on many features, such as the nature of the oil which has been spilled, its viscosity, the wind and water currents and, more importantly, on the ambient temperature. The amount of coagulant can be readily determined by mere mixture test by those skilled in the art. As it is usually very difficult to determine the exact amount of oil which has been spilled, it will in most instances be necessary to closely observe the consistency of the spill and to stop adding coagulant when the spill assumes a semi-rigid or gel-like appearance. In general, however, it has been found preferable to add coagulant in an amount of about 50 to about 100% of the weight of the oil spilled.

The invention is further illustrated by the following examples, in which the proportions given are in parts by weight unless otherwise indicated.

Example I 32 parts of Mata crude oil were poured over water. 30 parts of a mixture of 90% by weight of powdered wax and 10% by weight of microfine silica was poured over the oil spill and rapidly formed therewith a granular floating solid which was easily removed from the surface.

Example II 24.7 parts of Whole Arabian crude oil were poured over a water surface. 23 parts of an intimate mixture of 90% of powdered slack wax and 10% Micro-Cel T calcium silicate (passing 300 Mesh) was poured over the oil film to form a readily removable semi-solid.

Example III 13 parts of Whole Arabian crude were spilled on a water surface. Petroleum wax was melted and sprayed while hot onto the spill. 9 parts of wax were required to coagulate the crude oil into a semi-solid mass which was physically removable from the water.

Example IV

In two separate tests, 37 parts by weight of Mata heavy crude were spilled on a water surface. In one case, 27 parts of a mixture of 90% powdered asphalt and 10% of calcium silicate were required to coagulate the oil. In the other test, 37 parts of a mixture of 90% asphalt and 10% carbon black were required. The test was repeated, using carbon black and calcium silicate alone and they both failed to coagulate the oil since they sank before a uniform mixture could be achieved.

Example V 28.5 parts of Arabian Crude oil were spilled on a water surface. 25.3 parts of a high-melting asphalt powder (300° F. R & B passing 60 mesh) were sprinkled on the oil slick. Within 5 minutes the oil was adsorbed by the powdered asphalt to give a soft, granular material which was readily sieved off the surface with a 20 mesh screen. The treatment removed not only the bulk of the oil but also the usual iridescent oil film.

Example VI 32 parts of Mata crude oil were poured over water. 30 parts of an intimate mixture of 90% of a refined wax having a melting point of 125° F. and 10% of a hydrophobic, microfine silica were spread over the oil spill and rapidly formed therewith a granular floating solid which was easily removed from the surface.

Example VII 30 parts No. 2 diesel fuel were poured on a contained water surface and 15 parts of a stabilized wax powder were spread on the resulting oil film. The wax was prepared by the method of U.S. Pat. 3,152,917 and consisted of about 95% by weight of paraffin wax having a melting point of 126° F. and 5% of a hydrophobic microfine silica. The wax diesel fuel mixture which formed was a granular solid, easily removed from the water by means of a 10 mesh screen.

Example VIII 25 parts used SAW–30 motor oil were flowed onto water and 10 parts of a powdered microcrystalline wax (melting point 185° F.) containing 3% by weight, basis the wax, of a microfine precipitated silica were spread on the oil film. After 10 minutes the resulting soft granular solid was skimmed from the surface of the water with a 20 mesh sieve.

Example IX

In this experiment, the oil of Example VII was employed with the powdered slack wax of Example VII, stabilized against caking with 10% by weight basis the wax, of talc powdered to pass a 300 mesh sieve. The oil was coagulated by the wax-talc composition to a floating solid which was easily collected for disposal by means of a rake-like device.

Example X

The procedure of Example IX was repeated successfully using a mixture of 99% by weight of wax and 1% of finely divided bentonite.

Example XI

The procedure of Example IX was repeated successfully using a coagulating mixture composed of 85% of slack wax and 15% of diatomaceous earth.

While the present process is generally directed to the removal of oil from the surface of large bodies of water, the same is not limited thereto. In fact, since the process also removes the usual iridescent film caused by oil floating on water, it finds application in cleaning industrial waters, pools and the like.

What is claimed is:

1. A method for removing oil spills from the surface of a body of water, which comprises contacting said oil in an amount of about 50% to 100% of the weight of the oil with a coagulant mixture containing powdered wax and at least one hydrophilic anti-caking agent, and causing said oil to coagulate into a floating, semi-solid mass.

2. A method according to claim 1, wherein the semi-solid mass is mechanically recovered from the surface of said body of water and heated to remove water entrained therewith.

3. A method according to claim 2, wherein the heated semi-solid mass is burned to finally dispose thereof.

4. A method according to claim 1, wherein said anti-caking agent is selected from the group consisting of alkaline earth metal silicates, diatomaceous earth, bentonite, talc and silica.

5. A method according to claim 1, wherein said coagulant mixture is heated to a temperature at least 50° F. above its melting point and sprayed in a molten form onto said oil.

6. A method according to claim 1, wherein said wax has a melting point of at least about 110° F.

7. A method according to claim 1 wherein said wax is slack wax obtained by solvent dewaxing a wax distillate.

References Cited

UNITED STATES PATENTS 3,567,660   3/1971   Winkler et al. _____ 210—40 X

MICHAEL ROGERS, Primary Examiner

U.S. Cl. X.R.

210—DIG. 21